United States Patent [19]

Arai

[11] Patent Number: 4,484,803
[45] Date of Patent: Nov. 27, 1984

[54] OBJECTIVE LENS FOR REGENERATING A VIDEO DISC

[75] Inventor: Norikazu Arai, Komae, Japan

[73] Assignee: Konishiroku Photo Industry Co., Ltd., Japan

[21] Appl. No.: 443,238

[22] Filed: Nov. 22, 1982

[30] Foreign Application Priority Data

Nov. 20, 1981 [JP] Japan ............................ 56-185210

[51] Int. Cl.³ .......................... G02B 9/06; G02B 21/02
[52] U.S. Cl. .................................. 350/480; 350/410; 350/414
[58] Field of Search ..................... 350/480, 410, 414

[56] References Cited

U.S. PATENT DOCUMENTS 1,620,339  3/1927  Frederick et al. ............... 350/480
4,029,398  6/1977  Koizumi ......................... 350/414 X
4,270,843  6/1981  Goto ............................. 350/480

Primary Examiner—John K. Corbin
Assistant Examiner—Scott J. Sugarman
Attorney, Agent, or Firm—Jordan B. Bierman; Linda Bierman

[57] ABSTRACT

This invention relates to an objective lens for regenerating a video disc or the like. A semiconductor laser is used as a light source to directly drive an objective lens for carrying out tracking, and thus the lens must be small and light-weight, but the aberration on the optical axis could well be corrected. However, because of small-size of lens, a manufacture error such as eccentricity is greatly affected. A positive meniscus lens on the image side is approximated to a concentric configuration by an objective lens comprising two lenses whereby the influence resulting from eccentricity may be minimized.

7 Claims, 10 Drawing Figures

OBJECTIVE LENS FOR REGENERATING A VIDEO DISC

BACKGROUND OF THE INVENTION

1. Field of the Invention

The present invention relates to an objective lens for regenerating a video disc, a digital audio disc or the like, and particularly to an objective lens which can decrease a deterioration in performance resulting from an error of assembly.

2. Description of the Prior Art

In objective lenses used for regeneration of a video disc, a digital audio disc or the like, a high contrast up to about 1,000 pieces/mm of space frequency is required, and if a semi-conductor laser is used as a light source, it is necessary to control an aberration on an optical axis within a diffraction limit where N.A. is 0.45 to 0.5.

However, in the case the objective lens is directly driven to effect tracking, the optical axis of the objective lens is always kept vertically to the track and is moved parallel to the disc surface, and therefore, correction of out-of-axis aberration is rarely necessary in terms of principle.

In order to directly drive the objective lens, the objective lens must be as small and light as possible, and to this end, an objective lens whose focal distance is 4 to 5 mm is desired. If the working distance is not sufficient, there unfavorably gives rise to an inconvenience in that the objective lens comes to contact with the disc surface to damage the disc and the objective lens.

To be used for such a purpose, an objective lens is known which comprises a first cemented lens having a positive lens and a negative lens arranged in named order from an object side and a second positive meniscus lens with a convex surface directed towards the object (For example, Japanese Patent Application Laid-Open No. 55-4068). However, if the first lens and the second lens becomes eccentric, the aberration is greatly deteriorated, as a consequence of which it is necessary to make a clearance between the lens and a lens mount small or to make adjustment after assembled. In case of the former, a machine tool of high precision becomes necessary and in case of the latter, the number of steps of adjustment becomes necessary.

SUMMARY OF THE INVENTION

The present invention provides an objective lens for generating a video disc or the like which can decrease a deterioration in aberration resulting from an eccentricity between a first lens and a second lens by approximating a positive meniscus lens which is a second lens to a concentric configuration, and satisfies itself with various properties required for the objective lens of this kind.

A lens system according to the present invention comprises, as shown in FIG. 1, a first lens, which is a cemented positive lens having a positive lens and a negative lens arranged in named order from an object side and a second lens which is a positive meniscus lens with a concave surface directed towards the object, characterized by satisfying itself with the conditions as follows:

$$1.1f < r5 < 1.8f \quad (1)$$

$$-5.2f < (r2/n2 - n1) < -3.5f \quad (2)$$

$$0.6f < d1 + d4 < 0.72f \quad (3)$$

where
- f: resultant focal length of an overall system
- r2: radius of curvature of a cemented surface of a first lens
- r5: radius of curvature of a surface on an image side of a second lens
- d1: thickness of an optical axis of a first lens
- d4: thickness of an optical axis of a second lens
- n1: refractive index of the first lens
- n2: refractive index of the second lens The condition (1) is provided to approximate the second lens to concentricity, and if it exceeds the upper limit to be greater, a deviation from the concentric lens is great with the result that a deterioration in aberration of an optical axis resulting from eccentricity increases, resulting in a lens which is not suitable for volume production. This condition is also necessary for correction of sine condition, and if it exceeds the upper limit to be great, the sine condition is surplus in correction, and conversely, if it exceeds the lower limit to be small, the condition is short in correction.

The condition (2) is concerned with the introduction of a negative lens for correction of spherical aberration. It is advantageous to use a cemented lens as a first lens and arrange a negative lens on the image side in order to prevent a deterioration in performance resulting from eccentricity. If the radius of curvature of the cemented surface having a negative function exceeds the upper limit to be great, the spherical aberration is surplus in correction, and conversely, if it exceed the lower limit to be small, the spherical aberration is short in correction.

Also, the refractive index of potassium nitrate constituting the first group of lenses is desired to be satisfied with $$n2 - n1 \geq 0.2$$

If a difference in the refractive index of both potassium nitrates is smaller than the lower limit, $|r2|$ is small resulting in an increase in residual spherical aberration in an intermediate ring zone.

The condition (3) is concerned with the spherical aberration and sine condition, and when it exceeds the upper limit to be great, the curve of the sine condition increases. Also, the overall length of the lens becomes long and the working distance becomes short accordingly, which is not preferable. Conversely, if it exceeds the lower limit to be small, the curve of the sine condition decreases but the residual spherical aberration at the intermediate ring zone increases. In addition, the thickness of the peripheral edge of the lens is small, there gives rise to an inconvenience in manufacturing the lens.

DETAILED DESCRIPTION OF THE PREFERRED EMBODIMENTS

In the following, embodiments of the objective lens systems in accordance with the present invention.

In these embodiments:

M: Focusing magnification dc: Thickness of a cover glass on optical axis (The refractive index with respect to 8000 Å wavelength light of the cover glass is 1.51072.)

W.D.: Working distance

Embodiment 1

| f = 1.0 | | N.A. = 0.5 | M = 0 |
|---|---|---|---|
| dc = 0.2667 | | W.D. = 0.5113 | |
| $r_1 = 1.6710$ | $d_1 = 0.4$ | $n_1 = 1.51032$ | $\nu_1 = 64.1$ |
| $r_2 = -1.1148$ | $d_2 = 0.2222$ | $n_2 = 1.78439$ | $\nu_2 = 25.4$ |
| $r_3 = -2.7925$ | $d_3 = 0.0222$ | | |
| $r_4 = 0.7172$ | $d_4 = 0.2889$ | $n_3 = 1.78439$ | $\nu_3 = 25.4$ |
| $r_5 = 1.6805$ | | | |

$$\frac{r_2}{n_2 - n_1} = -4.0675$$

Embodiment 2

| f = 1.0 | | N.A. = 0.5 | M = 0 |
|---|---|---|---|
| dc = 0.2667 | | W.D. = 0.5183 | |
| $r_1 = 1.4143$ | $d_1 = 0.3556$ | $n_1 = 1.51032$ | $\nu_1 = 64.1$ |
| $r_2 = -1.3234$ | $d_2 = 0.2222$ | $n_2 = 1.82361$ | $\nu_2 = 23.9$ |
| $r_3 = -3.0798$ | $d_3 = 0.0222$ | | |
| $r_4 = 0.6882$ | $d_4 = 0.2444$ | $n_3 = 1.82361$ | $\nu_3 = 23.9$ |
| $r_5 = 1.2774$ | | | |

$$\frac{r_2}{n_2 - n_1} = -4.2242$$

Embodiment 3

| f = 1.0 | | N.A. = 0.5 | M = 0 |
|---|---|---|---|
| dc = 0.2667 | | W.D. = 0.5098 | |
| $r_1 = 1.7624$ | $d_1 = 0.4$ | $n_1 = 1.51032$ | $\nu_1 = 64.1$ |
| $r_2 = -1.1309$ | $d_2 = 0.2222$ | $n_2 = 1.82361$ | $\nu_2 = 23.9$ |
| $r_3 = -2.7088$ | $d_3 = 0.0222$ | | |
| $r_4 = 0.7433$ | $d_4 = 0.3111$ | $n_3 = 1.82361$ | $\nu_3 = 23.9$ |
| $r_5 = 1.7443$ | | | |

$$\frac{r_2}{n_2 - n_1} = -3.6097$$

Embodiment 4

| f = 1.0 | | N.A. = 0.45 | M = 0 |
|---|---|---|---|
| dc = 0.2667 | | W.D. = 0.5181 | |
| $r_1 = 1.4077$ | $d_1 = 0.3333$ | $n_1 = 1.51032$ | $\nu_1 = 64.1$ |
| $r_2 = -1.1425$ | $d_2 = 0.2222$ | $n_2 = 1.73705$ | $\nu_2 = 27.5$ |
| $r_3 = -3.0298$ | $d_3 = 0.0222$ | | |
| $r_4 = 0.6703$ | $d_4 = 0.2444$ | $n_3 = 1.73705$ | $\nu_3 = 27.5$ |
| $r_5 = 1.3665$ | | | |

$$\frac{r_2}{n_2 - n_1} = -5.0390$$

Embodiment 5

| f = 1.0 | | N.A. = 0.47 | M = 0 |
|---|---|---|---|
| dc = 0.2665 | | W.D. = 0.5133 | |
| $r_1 = 1.7057$ | $d_1 = 0.3886$ | $n_1 = 1.51032$ | $\nu_1 = 64.1$ |
| $r_2 = -1.1243$ | $d_2 = 0.1777$ | $n_2 = 1.79236$ | $\nu_2 = 40.9$ |
| $r_3 = -2.6581$ | $d_3 = 0.0222$ | | |
| $r_4 = 0.7066$ | $d_4 = 0.2887$ | $n_3 = 1.79236$ | $\nu_3 = 40.9$ |
| $r_5 = 1.5189$ | | | |

$$\frac{r_2}{n_2 - n_1} = -3.9864$$

Aberration curves of Embodiments 1 to 5 are shown in FIGS. 2 to 6.

Figure 1:
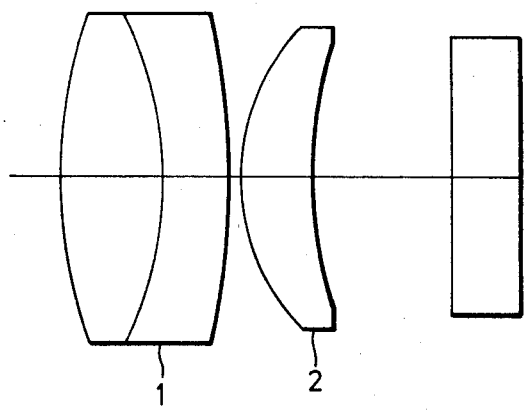
FIG. 1 is a sectional view of an example of a lens system in accordance with the present invention.
Figure 2:
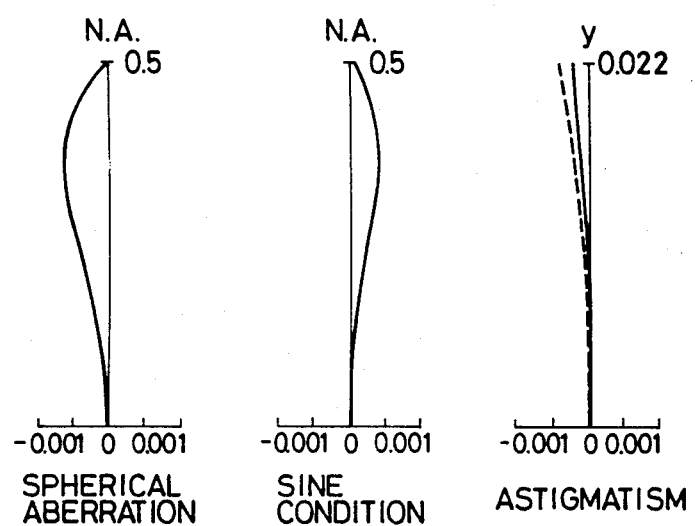
FIGS. 2 to 6 show the aberration in a first example to a fifth example, respectively.
Figure 3:
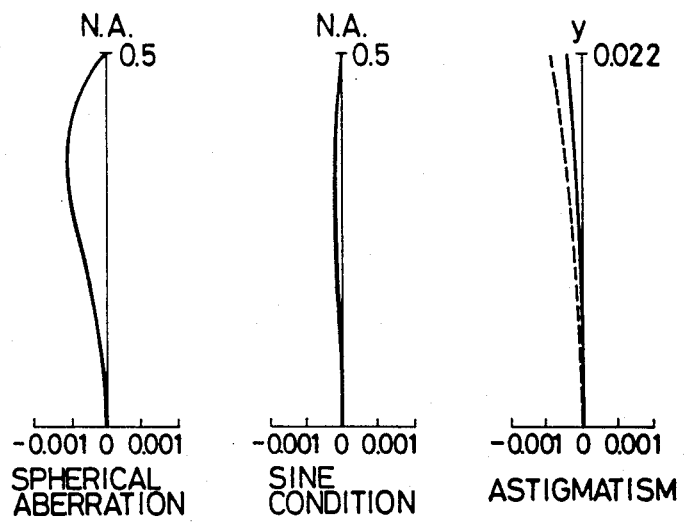
Figure 4:
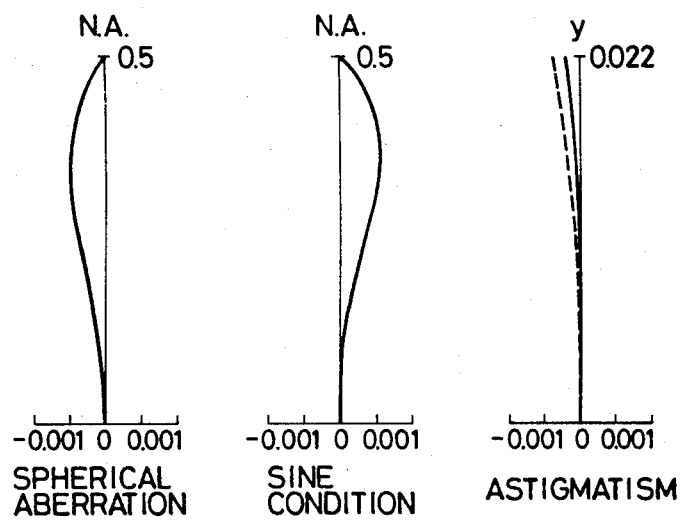
Figure 5:
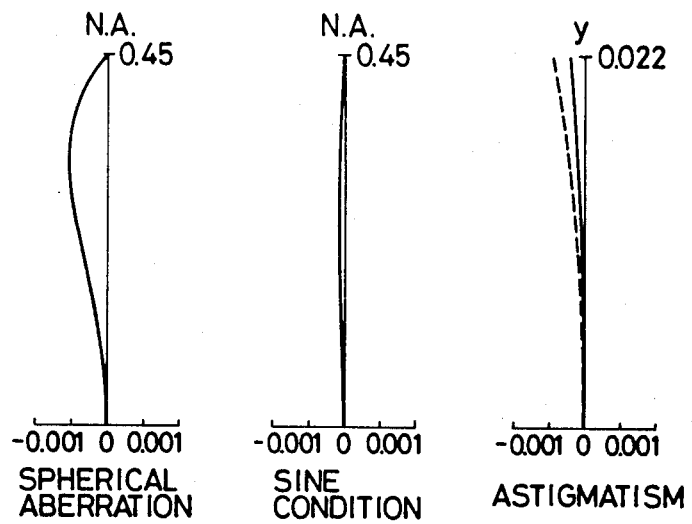
Figure 6:
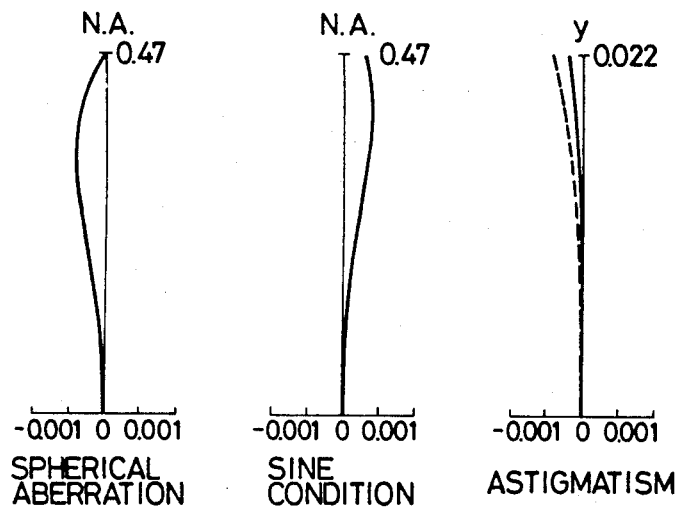
Figure 7:
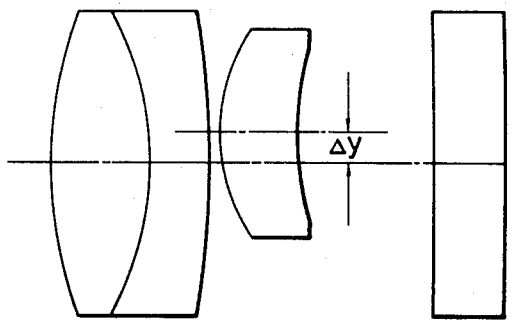
FIGS. 7 and 8 show a typical state of eccentricity.
Figure 8:
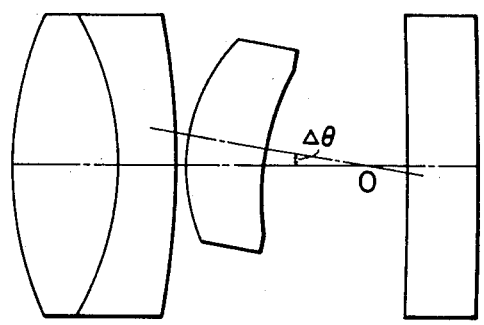

The influence of eccentricity on the objective lens of the present invention as described hereinbefore will be discussed. FIGS. 7 and 8 show the eccentricity generated in the lens system of the present invention. The optical axis of the first and second lens is deviated in parallel through $\Delta y$ (FIG. 7) or the optical axis of the second lens is inclined with respect to the first lens through $\Delta \theta$ about the center of curvature O on the object side of the second lens (FIG. 8). The typical eccentricities in this lens system are the aforesaid two kinds of eccentricities. Thus, the study on these two eccentricities will suffice.

Figure 9:
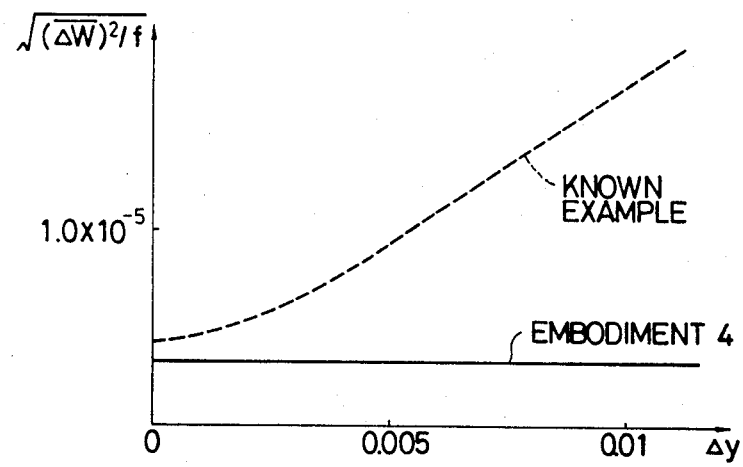
FIGS. 9 and 10 are diagrams showing the relation between the amount of eccentricity and the amount of aberration.
Figure 10:
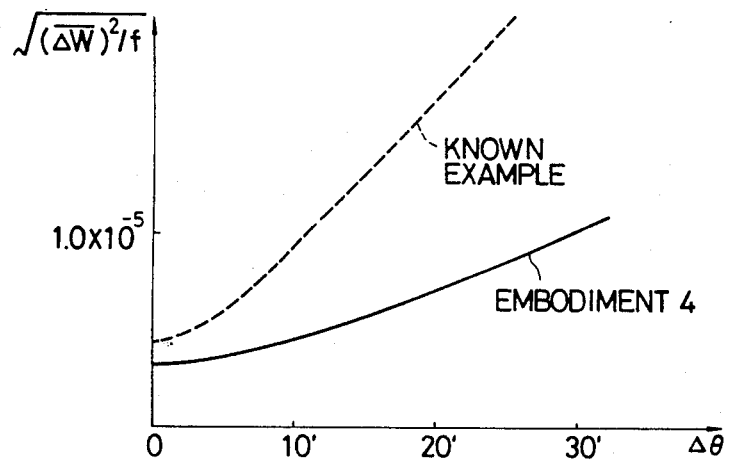

With respect to Embodiment 4 of the objective lens in accordance with the present invention and the following well known example as a comparative object, the aberration on the optical axis is represented by the square mean $\sqrt{(\Delta W)^2}$ of wave-face aberration, and the relation of the eccentric amount therewith is shown in FIGS. 9 and 10. In the objective lens of the present invention, there occurs little deterioration of aberration resulting from the parallel deviation $\Delta y$, and a deterioration resulting from the inclination $\Delta \theta$ of the optical axis remaining at about ⅓ of the well known example.

| f = 1.0 | | N.A. = 0.45 | M = 0 |
|---|---|---|---|
| dc = 0.2558 | | W.D. = 0.5581 | |
| $r_1 = 2.605$ | $d_1 = 0.4070$ | $n_1 = 1.51462$ | $\nu_1 = 64.1$ |
| $r_2 = -0.8514$ | $d_2 = 0.2581$ | $n_2 = 1.75607$ | $\nu_2 = 26.6$ |
| $r_3 = -2.1127$ | $d_3 = 0$ | | |
| $r_4 = 0.7804$ | $d_4 = 0.3256$ | $n_3 = 1.75607$ | $\nu_3 = 26.6$ |
| $r_5 = 2.8579$ | | | |

$$\frac{r_2}{n_2 - n_1} = -3.5259$$

What is claimed is:

1. An objective lens for regenerating a video disc, or the like, comprising a first lens, which is a cemented positive lens having a positive lens and a negative lens arranged in named order from an object side, and a second lens which is a positive meniscus lens with a concave surface directed towards the object, characterized by satisfying itself with the conditions as follows:

$$1.1f < r5 < 1.8f \tag{1}$$

$$-5.2f < (r2/n2 - n1) < -3.5f \tag{2}$$

$$0.6f < d1 + d4 < 0.72f \tag{3}$$

where
- f: resultant focal length of an overall system
- r2: radius of curvature of a cemented surface of a first lens
- r5: radius of curvature of a surface on an image side of a second lens
- d1: thickness of an optical axis of a first lens
- d4: thickness of an optical axis of a second lens
- n1: refractive index of the first lens
- n2: refractive index of the second lens.

2. An objective lens of claim 1 characterized by $$n2 - n1 \geq 0.2.$$

3. An objective lens according to claim 2, as specified by the following data:

| f = 1.0 | N.A. = 0.5 | M = 0 |
|---|---|---|

| -continued | | | |
|---|---|---|---|
| $dc = 0.2667$ | | W.D. = 0.5113 | |
| $r_1 = 1.6710$ | $d_1 = 0.4$ | $n_1 = 1.51032$ | $\nu_1 = 64.1$ |
| $r_2 = -1.1148$ | $d_2 = 0.2222$ | $n_2 = 1.78439$ | $\nu_2 = 25.4$ |
| $r_3 = -2.7925$ | $d_3 = 0.0222$ | | |
| $r_4 = 0.7172$ | $d_4 = 0.2889$ | $n_3 = 1.78439$ | $\nu_3 = 25.4$ |
| $r_5 = 1.6805$ | | | |

4. An objective lens according to claim 2, as specified by the following data:

| $f = 1.0$ | | N.A. = 0.5 | $M = 0$ |
|---|---|---|---|
| $dc = 0.2667$ | | W.D. = 0.5183 | |
| $r_1 = 1.4143$ | $d_1 = 0.3556$ | $n_1 = 1.51032$ | $\nu_1 = 64.1$ |
| $r_2 = -1.3234$ | $d_2 = 0.2222$ | $n_2 = 1.82361$ | $\nu_2 = 23.9$ |
| $r_3 = -3.0798$ | $d_3 = 0.0222$ | | |
| $r_4 = 0.6882$ | $d_4 = 0.2444$ | $n_3 = 1.82361$ | $\nu_3 = 23.9$ |
| $r_5 = 1.2774$ | | | |

5. An objective lens according to claim 2, as specified by the following data:

| $f = 1.0$ | | N.A. = 0.5 | $M = 0$ |
|---|---|---|---|
| $dc = 0.2667$ | | W.D. = 0.5098 | |
| $r_1 = 1.7624$ | $d_1 = 0.4$ | $n_1 = 1.51032$ | $\nu_1 = 64.1$ |
| $r_2 = -1.1309$ | $d_2 = 0.2222$ | $n_2 = 1.82361$ | $\nu_2 = 23.9$ |

| -continued | | | |
|---|---|---|---|
| $r_3 = -2.7088$ | $d_3 = 0.0222$ | | |
| $r_4 = 0.7433$ | $d_4 = 0.3111$ | $n_3 = 1.82361$ | $\nu_3 = 23.9$ |
| $r_5 = 1.7443$ | | | |

6. An objective lens according to claim 2, as specified by the following data:

| $f = 1.0$ | | N.A. = 0.45 | $M = 0$ |
|---|---|---|---|
| $dc = 0.2667$ | | W.D. = 0.5181 | |
| $r_1 = 1.4077$ | $d_1 = 0.3333$ | $n_1 = 1.51032$ | $\nu_1 = 64.1$ |
| $r_2 = -1.1425$ | $d_2 = 0.2222$ | $n_2 = 1.73705$ | $\nu_2 = 27.5$ |
| $r_3 = -3.0298$ | $d_3 = 0.0222$ | | |
| $r_4 = 0.6703$ | $d_4 = 0.2444$ | $n_3 = 1.73705$ | $\nu_3 = 27.5$ |
| $r_5 = 1.3665$ | | | |

7. An objective lens according to claim 2, as specified by the following data:

| $f = 1.0$ | | N.A. = 0.47 | $M = 0$ |
|---|---|---|---|
| $dc = 0.2665$ | | W.D. = 0.5133 | |
| $r_1 = 1.7057$ | $d_1 = 0.3886$ | $n_1 = 1.51032$ | $\nu_1 = 64.1$ |
| $r_2 = -1.1243$ | $d_2 = 0.1777$ | $n_2 = 1.79236$ | $\nu_2 = 40.9$ |
| $r_3 = -2.6581$ | $d_3 = 0.0222$ | | |
| $r_4 = 0.7066$ | $d_4 = 0.2887$ | $n_3 = 1.79236$ | $\nu_3 = 40.9$ |
| $r_5 = 1.5189$ | | | |

* * * * *